United States Patent
Chen et al.

(10) Patent No.: US 7,764,635 B2
(45) Date of Patent: Jul. 27, 2010

(54) CROSS-LAYER SELF-HEALING IN A WIRELESS AD-HOC NETWORK

(75) Inventors: Wai Chen, Parsippany, NJ (US); Latha Kant, Basking Ridge, NJ (US); Christopher Sadler, Princeton, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1038 days.

(21) Appl. No.: 11/114,846

(22) Filed: Apr. 26, 2005

(65) Prior Publication Data

US 2006/0239216 A1 Oct. 26, 2006

(51) Int. Cl.
*H04B 7/00* (2006.01)

(52) U.S. Cl. .................. 370/310.2; 370/328; 370/329; 370/338; 370/315; 455/41.2; 455/445; 455/450

(58) Field of Classification Search .............. 370/328, 370/329, 338, 310.2; 455/41.1, 41.2, 522, 455/445, 450; 375/346
See application file for complete search history.

(56) References Cited

U.S. PATENT DOCUMENTS

| | | | | |
|---|---|---|---|---|
| 5,757,783 A * | 5/1998 | Eng et al. | ............... | 370/315 |
| 5,872,773 A * | 2/1999 | Katzela et al. | ........... | 370/256 |
| 5,987,011 A * | 11/1999 | Toh | ................ | 370/331 |
| 6,304,556 B1 * | 10/2001 | Haas | ................ | 370/254 |
| 6,434,134 B1 * | 8/2002 | La Porta et al. | ......... | 370/338 |
| 6,535,498 B1 * | 3/2003 | Larsson et al. | .......... | 370/338 |
| 6,621,805 B1 * | 9/2003 | Kondylis et al. | ......... | 370/329 |
| 6,678,252 B1 * | 1/2004 | Cansever | ............... | 370/253 |
| 6,775,258 B1 * | 8/2004 | van Valkenburg et al. | ... | 370/338 |
| 6,894,991 B2 * | 5/2005 | Ayyagari et al. | ......... | 370/325 |
| 6,904,021 B2 * | 6/2005 | Belcea | ................ | 370/252 |
| 6,961,575 B2 * | 11/2005 | Stanforth | ................ | 455/445 |

(Continued)

OTHER PUBLICATIONS

Javier Gomez et al., "A Case for Variable-Range Transmission Power Control in Wireless Multihop Networks", *Proceeding IEEE INFOCOM 2004*, 2004.

(Continued)

*Primary Examiner*—Sharad Rampuria
(74) *Attorney, Agent, or Firm*—Philip J. Feig (57) ABSTRACT

Disclosed is a method and apparatus for improved self-healing in a mobile ad-hoc wireless network in which network communication functions are divided into a plurality of functional layers. The system utilizes cross-layer self-healing techniques. Network data from at least one of the functional layers is stored, for example in a storage unit of the network node. The stored network data is then used to modify the functioning of at least one of the other layers. In one embodiment, a management module manages the storage and use of the network data. In particular embodiments, the stored network data relates to successful transmission rates and/or clear channel rates, and this stored data is used to adjust the transmission power of the network node. In another embodiment, the stored data may be used to generate a table of interchangeable network nodes, which may then be used to reroute a data packet to a network node other than an originally specified destination node. In yet another embodiment, the stored data may be used to generate a list of recent neighbor nodes, which data may be used to reroute data packets to intermediate network nodes.

15 Claims, 7 Drawing Sheets

U.S. PATENT DOCUMENTS

| | | | |
|---|---|---|---|
| 7,002,910 B2* | 2/2006 | Garcia-Luna-Aceves et al. | 370/229 |
| 7,031,266 B1* | 4/2006 | Patel et al. | 370/254 |
| 7,042,394 B2* | 5/2006 | Sayers | 342/432 |
| 7,042,867 B2* | 5/2006 | Whitehill et al. | 370/338 |
| 7,082,117 B2* | 7/2006 | Billhartz | 370/338 |
| 7,088,727 B1* | 8/2006 | Short et al. | 370/401 |
| 7,177,646 B2* | 2/2007 | O'Neill et al. | 455/450 |
| 7,280,483 B2* | 10/2007 | Joshi | 370/238 |
| 7,616,599 B2* | 11/2009 | Jabbari et al. | 370/328 |
| 2003/0064744 A1* | 4/2003 | Zhang et al. | 455/522 |
| 2004/0202197 A1* | 10/2004 | Gao et al. | 370/469 |
| 2005/0030921 A1* | 2/2005 | Yau | 370/329 |
| 2005/0031059 A1* | 2/2005 | Moore et al. | 375/346 |
| 2005/0157698 A1* | 7/2005 | Park et al. | 370/351 |
| 2006/0105764 A1* | 5/2006 | Krishnaswamy et al. | 455/424 |

OTHER PUBLICATIONS

David B. Johnson et al., "Dynamic Source Routing in Ad Hoc Wireless Networks", *Mobile Computing*, pp. 153-181, Kluwer Academic Publishers, 1996, T. Imielinski and H. Korth, ed.

Latha Kant et al, "Alarm Model Specification and Dynamic Multilayer Self-healing Mechanisms for Commercial and Ad-hoc Wireless Networks", *Proceedings 15th IEEE International Symposium on Personal, Indoor and Mobile Radio Communications*, 2004.

Farinaz Koushanfar et al, "Fault Tolerance Techniques for Wireless Ad Hoc Sensor Networks", Proceedings IEEE Sensors, 2002.

Martin Kubisch et al, "Distributed Algorithms for Transmission Power Control in Wireless Sensor Networks", *Proceedings IEEE Wireless Communications and Networking Conference*, 2003.

Charles E. Perkins et al, "Ad-hoc On-Demand Distance Vector Routing", *Proceedings 2nd IEEE Workshop on Mobile Computing Systems and Applications*, Feb. 1999.

Klara Nahrstedt et al, "Cross-Layer Architectures for Bandwidth Management in Wireless Networks", Resource Management in Wireless Networking, Kluwer Academic Publishers, 2004, M. Cardei, I. Cardei, and D. Du, ed.

Mihail L. Sichitiu, "Cross-Layer Scheduling for Power Efficiency in Wireless Sensor Networks", *Proceedings IEEE INFOCOM 2004*, 2004.

M. Steinder et al, "Probabilistic Event-Driven Fault Diagnosis Through Incremental Hypothesis Updating", 2003, pp. 635-648, Kluwer Academic Publishers, 2003, G. Goldszmidt and J. Schonwalder, ed.

John A. Stine, "Integrating the Physical and Link Layers in Modeling the Wireless Ad Hoc Networking MAC Protocol, Synchronous Collision Resolution", *Mitre Corporation Technical Report*, 2003.

Ying Zhang et al, "Fault Recovery Based on Checkpointing for Hard Real-Time Embedded Systems", *Proceedings of the 18th IEEE International Symposium on Defect and Fault Tolerance in VLSI Systems*, Nov. 2003.

\* cited by examiner

CROSS-LAYER SELF-HEALING IN A WIRELESS AD-HOC NETWORK

GOVERNMENT LICENSE RIGHTS

This invention was made with Government support under DAAD19-01-2-0011 awarded by the U.S. Army Research Laboratory. The Government has certain rights in this invention.

BACKGROUND OF THE INVENTION

The present invention relates generally to wireless networks, and more particularly to self-healing in a wireless mobile ad-hoc network.

Most commercial public wireless networks contain a significant amount of network infrastructure which allows mobile wireless devices (e.g., wireless telephones) to communicate with each other as well as with other networks (e.g., a wired telephone network). In such networks, the infrastructure, which includes components such as base stations and other network controllers, handles network control and routing operations. The locations of the network infrastructure components are fixed, and the locations of the various components are designed to provide a desired level of network performance. Thus, each wireless device communicates directly with fixed network infrastructure components or uses the fixed infrastructure to connect it to other devices for subsequent communication.

In areas where there is little or no communication infrastructure, wireless devices may communicate with each other by organizing into an ad-hoc wireless network. Mobile ad-hoc wireless networks have no central control or system administrative support (for network setup, configuration and operations), and each wireless device which is part of the network operates as an individual communication device as well as part of the network infrastructure. Thus, each wireless device may originate and receive messages, but each wireless device also functions to route messages between other wireless devices which may otherwise be unable to directly communicate with each other. Instead of relying on wireless network infrastructure for communication, mobile ad-hoc wireless networks rely on peer-to-peer interactions for network communication. There are many applications for mobile ad-hoc wireless networks. For example, military personnel on the field of battle; emergency disaster relief personnel coordinating efforts where there is no wireless infrastructure; informal gatherings where participants wish to communicate with each other; and sensor networks where sensor elements scatter randomly to form an ad-hoc network for on-demand communication purposes. It is also noted that mobile ad-hoc wireless networks are useful for devices other than telephones, for example wireless PDAs, computers, sensors, or any other type of communication device.

The varying network topology of a mobile wireless ad-hoc network complicates various network functions, for example data packet routing. In a conventional wireless network, which utilizes fixed network infrastructure, the topology of the network is static, and each of the routing nodes in the network maintains network topology information to assist in the routing determination. However, the network topology in a mobile wireless ad-hoc network changes dynamically, with new links being created and existing links being torn down, as each of the wireless devices moves around in the network. Thus, nodes in a mobile ad-hoc network function in an inherently unreliable environment, with unpredictable changes causing node and route failures. As a result, nodes need to autonomously adjust their operating parameters in order to ensure that critical information is reliably delivered despite the unreliability of the network. This autonomous adjustment of a network node in order to dynamically adjust and compensate for degradations in network services is referred to as "self-healing" of network nodes. More specifically, self-healing is the ability of the network to autonomously detect non-malicious network-related problems encountered while transporting applications and data through the network, and to take corrective actions in response to such problems, without participation of human administrators or users. Examples of non-malicious network-related problems include hard failures (i.e., failure/malfunctioning of one or more network elements) and soft failures (i.e., loss in network connectivity due to performance degradation caused by the dynamics/unpredictability of the underlying communications network). Such self-healing ability is enabled by a set of operations, to be performed by network nodes, which are designed to detect and correct specific network-related problems.

There have been prior attempts at self-healing in mobile ad-hoc wireless networks. For example, prior self-healing routing protocols have been designed to establish new routes to maintain system connectivity as node failures and mobility change the topology of the network. However, one of the problems with prior self-healing protocols is that they originated from wired network protocols. Assumptions that are valid in wired networks, such as the notion that all destinations are unique and that the best route at the start of the transmission will be the best route through the duration of the transmission, are no longer valid for mobile ad-hoc wireless networks. Thus, these prior attempts are unable to effectively deal with situations in which a data packet destination becomes unreachable after the data packet is initially transmitted.

Self-healing has also been applied at the hardware level, generally through the use of redundant back-up systems which activate upon a hardware failure. However, self-healing at the hardware level is generally expensive in terms of equipment, area, financial cost, and energy. Further, due to the transient nature of mobile ad-hoc wireless networks, redundant hardware self-healing is not always a practical approach.

There is a need for improved self-healing techniques in mobile ad-hoc wireless networks.

BRIEF SUMMARY OF THE INVENTION

The present invention provides for improved self-healing in a mobile ad-hoc wireless network in which network communication functions are divided into a plurality of functional layers, by utilizing cross-layer self-healing techniques. In accordance with the principles of the invention, network data from at least one of the functional layers is stored, and the stored network data is then used to modify the functioning of at least one of the other layers. In one embodiment, a management module manages the storage and use of the network data. One advantage of such a system is that the operation of the network node is improved by utilizing information from one or more network layers in other network layers, while still maintaining the benefits of a layered approach to networking.

In particular embodiments, the stored network data relates to successful transmission rates and/or clear channel rates, and this stored data is used to adjust the transmission power of the network node. In another embodiment, the stored data may be used to generate a table of interchangeable network nodes, which may then be used to reroute a data packet to a network node other than an originally specified destination node. In yet another embodiment, the stored data may be used to generate a list of recent neighbor nodes, which data may be used to reroute data packets to intermediate network nodes.

A network in which the principles of the present invention are implemented is advantageous in that it improves overall response time, reduces network overhead, and promotes layered abstractions by handling problems at the layers in which corrective actions may be taken. Since evaluations are made based on information that is stored by each of the protocol layers over time, the information needed to evaluate a particular situation and enact the proper corrective measures will be available without having to involve the other layers. If corrective actions are necessary at multiple layers, then such actions may be taken at each layer individually as a data packet passes through the layer. Thus, the communication protocol layers continue to function according to the layered approach (with specific functions being contained within specified layers).

These and other advantages of the invention will be apparent to those of ordinary skill in the art by reference to the following detailed description and the accompanying drawings.

DETAILED DESCRIPTION

Figure 1:
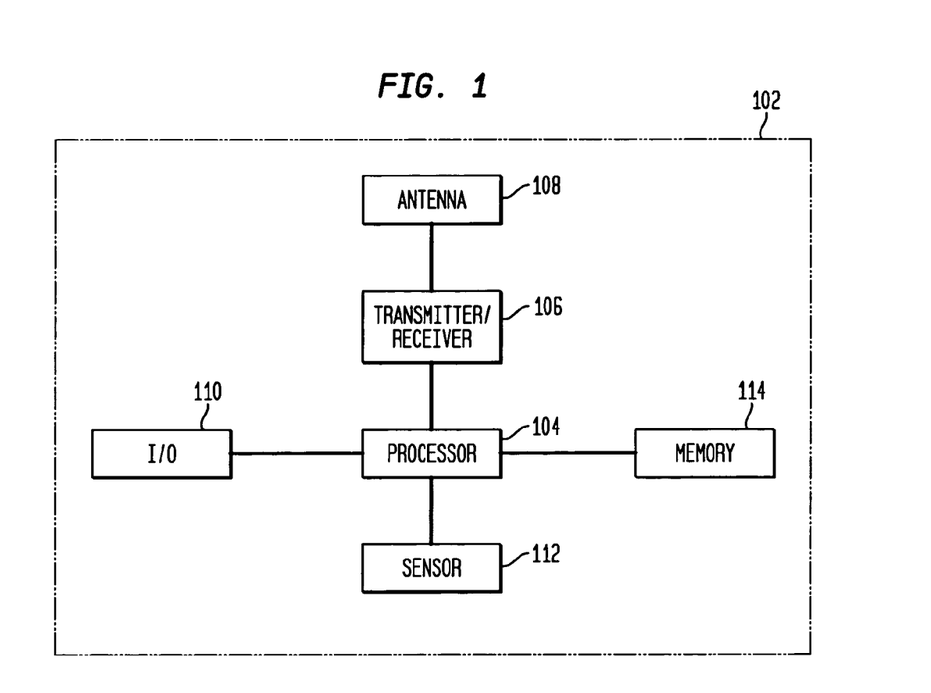
FIG. 1 shows a high level block diagram of a mobile node which may be configured to operate in a mobile ad-hoc wireless network in accordance with the principles of the present invention.

FIG. 1 shows a high level block diagram of a mobile node 102 which may be configured to operate in a mobile ad-hoc wireless network in accordance with the principles of the present invention. Mobile node 102 contains a processor 104 which controls the overall operation of mobile node 102 by executing computer program instructions which define such operation. The computer program instructions may be stored in a memory 114. Memory 114 represents any machine readable device capable of storing computer program instructions and data. In various embodiments, memory 114 may be RAM, ROM, EPROM, magnetic disk, optical disk, or any other type of memory or storage device. Further, memory 114 as shown in FIG. 1 may represent any one or more devices, or any combination of such devices. Memory 114 is shown in FIG. 1 as a single element for ease of reference only. The operation of the mobile node 102 is controlled by processor 104 executing the stored computer program instructions.

Mobile node 102 also comprises a transmitter/receiver 106 for sending and receiving information via a wireless communication channel. Such transmitter/receiver may be any well-known radio transmitter/receiver capable of wireless communication between nodes (e.g., IEEE 802.11 radios, joint tactical radio system (JTRS) radios, etc.). Transmitter/receiver 106 is connected to antenna 108 in a well known manner for receiving and transmitting wireless signals. Mobile node 102 also includes input/output 110 which represents devices which allow for user interaction with the mobile node 102. Such device may include a keypad for allowing a user to enter data, a display for visually displaying information to a user, a microphone for allowing a user to enter audible data, a speaker for playing audible information to a user, or any other input/output device for user interaction. One skilled in the art will recognize that input/output 110 may represent any combination of well known input/output devices depending upon the particular implementation. In one embodiment, mobile node 102 also comprises one or more sensors 112 which allow the mobile node 102 to perform various tasks required for the particular mobile ad-hoc wireless network implementation. For example, and without limitation, sensor 112 may represent devices that sense temperature, location (e.g. global positioning system (GPS) receiver), sound, vibrations, etc. The data from sensor 112 may be stored in memory 114 for use by the mobile node 102. One skilled in the art will recognize that an implementation of a mobile node will contain other components as well, and that FIG. 1 is a high level representation of some of the components of such a mobile node for illustrative purposes. The actual components will vary depending upon the particular implementation. Further, given the description herein, one skilled in the art could readily configure computer program instructions necessary to implement the functions of a mobile node in accordance with the principles on the invention.

Figure 2:
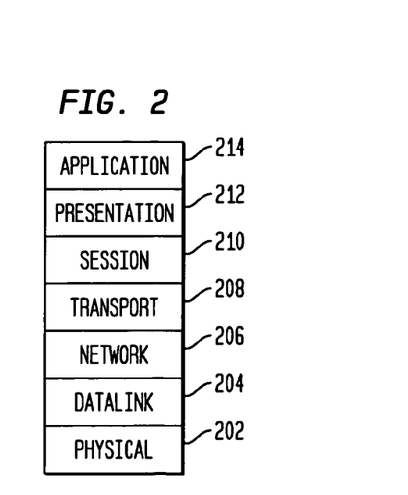
FIG. 2 illustrates the seven layers of the OSI protocol model.

In one embodiment, the mobile node 102 operates in accordance with the Open Standards Interconnect (OSI) protocol model for networking, which specifies how information is handled when being transported over a network and how software within a node interacts with the data and the network. The OSI model is a layered approach to networking and defines seven layers at which specific networking functions are performed. The layers are designed so that specific functions are contained within specific layers, and the interface between functions is specified at the boundaries between the layers. The OSI networking model is well known in the art and will be described herein only to the extent necessary for an understanding of the present invention. The seven layers of the OSI model are illustrated in FIG. 2. The lowest layer is the physical layer 202, which provides for physical connectivity between networked devices. Transmission and receipt of data from the physical medium (e.g., radio frequencies) is managed at this layer. The second layer is the data link layer 204, which provides reliable transmission of data across the physical link. The data link layer 204 performs functions relating to physical addressing, network topology, physical link management, error notification, ordered delivery of frames, and flow control. The third layer of the OSI protocol is the network layer 206, which controls the routing of data. This layer handles the addressing and delivery of data and provides for congestion control. An example of a network layer interface is the Internet Protocol (IP). The fourth layer of the OSI model is the transport layer 208, which is responsible for the reliable transmission of data. The major responsibility of this layer is data integrity, i.e., ensuring that data is transmitted between hosts reliably and timely. This layer will detect errors and lost data, recover lost data, and manage the retransmission of data as necessary. The transport layer determines the type of connection that will be created and creates one or more appropriate network connections. Examples of transport layer protocols are the Transmission Control Protocol (TCP) and the User Datagram Protocol (UDP). The fifth layer of the OSI model is the session layer 210, which manages and tracks various connections. The sixth layer of the OSI model is the presentation layer 212, which handles the conversion of data between platform independent (e.g., standards-based) formats and formats understood by the local machine. The seventh and highest layer of the OSI model is the application layer 214, which represents the user interface, or the application software utilizing the network data.

While the description herein describes the present invention in an embodiment which utilizes the OSI model for network communication and functions, it is to be understood that the present invention is not limited to OSI model implementations. The present invention may be implemented in any network which utilizes a layered approach to network communication and functions. The present invention is useful in any network in which network communication functions are divided into functional layers, with each of the layers performing a defined function, and a defined interface between layers for inter-layer communication.

Figure 3:
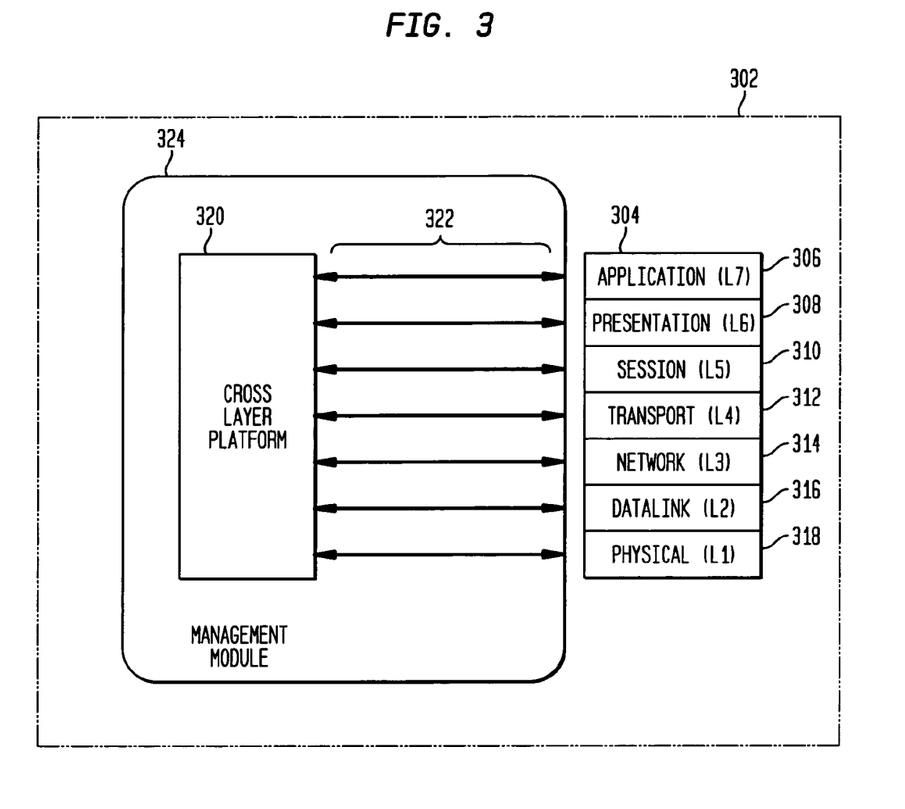
FIG. 3 shows a logical block diagram of a network node configured in accordance with an embodiment of the invention.

FIG. 3 shows a logical block diagram of a network node 302 configured in accordance with an embodiment of the invention. The elements of FIG. 3 are not necessarily hardware elements, but instead are intended to illustrate functional and logical elements of a network node in accordance with the principles of the invention. As such, the various elements shown in FIG. 3 may be implemented by appropriate hardware, software, and combinations of hardware and software. The OSI model is represented as 304, which shows each of the functional layers (306-318) of the OSI model (also referred to as layers L1-L7). Network node 302 also includes a management module 324. The management module 324 communicates with the OSI model 304 via communication paths 322. In one embodiment, these communication paths 322 are implemented with appropriate computer program instructions which provide interfaces with each of the network layers as well as with a cross layer platform 320. The cross layer platform 320 stores and organizes the data received from the various layers of the OSI model 304. In addition, and as will be described in further detail below, the cross layer platform 320 also provides data back to the various layers of the OSI model 304 under control of the management module 324 in order to improve the self-healing operations of the network node 302.

In accordance with the principles of the invention, network data from one or more of the OSI model 304 layers is stored in the cross layer platform 320 via communication paths 322. The stored data may then be analyzed by the management module 324, and the functioning of at least one other layer may then be modified based on the analysis of the stored data. Thus, the functioning of one (or more) of the OSI model layers is modified based upon the data from one (or more) of the other OSI model layers. The modification of the functioning of an OSI model layer may be performed by feeding data from one layer into another layer or by analyzing the data from one layer and then generating appropriate instructions to modify the other layer based on such analysis. One advantage of such a system is that the operation of the network node 302 is improved by utilizing information from one (or more) network layer in other network layers, while still maintaining the benefits of the OSI model. Thus, the management module 324 executes any necessary self-healing mechanisms at each protocol layer as the data packet is passed through the protocol layer. The management module also ensures consistency of the self-healing actions taken at the different layers. This improves overall response time, reduces overhead, and promotes layered abstractions by handling problems at the layers in which corrective actions may be taken. Since the evaluations are made based on information that is stored by each of the protocol layers in the cross layer platform over time, the information needed to evaluate the situation and enact the proper corrective measures will be available without having to involve the other layers. If corrective actions are necessary at multiple layers, they will be taken at each layer individually as the packet passes through them. Thus, the protocol layers continue to function according to the well known model, with specific functions being contained within specific layers, and with communication between the layers being specified by boundary interfaces. Various embodiments of the invention will now be described in conjunction with FIGS. 4-8.

The principles of the present invention may be applied in order to use layer 1 data at other protocol layers. As described above, the physical layer 318 (L1) provides for physical connectivity between networked devices. One of the data items that may be retrieved from this layer is information on the current status of the battery of the node. The analog to digital converter (ADC) that is standard on most microcontrollers provides an estimate of the current battery status. This information may be passed from the physical layer 318 to the cross layer platform 320 via the appropriate communication path 322. The management module 324 may then evaluate the data and, if the battery voltage drops below some predetermined level (adjustable via the management module) then the management module 324 may modify the functioning of layers 5-7 by halting all not-critical functions of those layers (session 310, presentation 308, application 306). Further, the management module 324 may modify the functioning of layer 3 (network 314) (L3) so that the network layer 314 does not respond to route requests and refuses to forward packets for non-critical applications. These modifications of layers 3 and 5-7 using information from layer 1 allows for better packet prioritization when low battery power is detected.

The principles of the present invention may be applied in order to use layer 2 (L2) data at other protocol layers. As described above, layer 2 is the data link layer 316 which provides reliable transmission of data across the physical link. In one embodiment of the invention, statistics from layer 2 are used to adjust the transmission power of the network node at layer 1. The concept of changing the transmission power in energy-constrained ad hoc networks has been used as a proactive measure to conserve energy and increase network capacity by using the minimum transmission power required to move packets hop-to-hop. However, in accordance with this embodiment of the invention, transmission power is adjusted as a reactive measure in order to self-heal the network by reconnecting orphaned nodes and combating poor link quality, congestion, and high collision rates. This reactive self-healing is possible in accordance with the principles of the present invention by using datalink layer 316 data stored in the cross layer platform 320 to modify the functions of the physical layer 318. Prior to the present invention, such datalink layer 316 data has been unavailable to modify the functioning of the physical layer 318 in this way.

It is noted that certain network problems may be corrected by increasing the node's transmission power, while other problems may be corrected by decreasing the node's transmission power. Analysis of datalink layer 316 data stored in the cross layer platform 320 allows the management module 324 to isolate the source of the problem and take the proper action. For example, increasing transmission power is beneficial in situations where communication is hindered by a lack of reliable connections. In the presence of poor communication link quality, increasing transmission power can help the routing protocol get packets through the network that would otherwise arrive corrupted. For nodes that have become orphaned (i.e., lost communication with other nodes in the ad-hoc wireless network) due to node mobility, increasing the transmission power will aid the routing protocol by allowing these orphaned nodes to reconnect with the network. In these situations, increasing a node's transmission power reduces network latency and overall energy consumption by getting messages to their destinations in fewer attempts.

On the other hand, reducing transmission power is effective in combating collision and congestion problems which are caused by high network load. A large percentage of collisions occur when two transmissions with different destinations occur close to each other and overlap at one of the receiving or forwarding nodes. An analysis of congestion provides similar observations. The difference is that in the congestion case, nodes are forced to wait until the communication channel is free rather than wasting energy in lost transmissions. In both of these situations, reducing the transmission power helps the routing protocol by reducing the number of packets lost in transit and reducing the average time to find a clear channel. This, in turn, reduces transmission latency. Even though the hop count increases, this method also reduces energy consumption. In the case of collisions, energy is saved by reducing the number of retransmissions. Both cases, though, are signs of a dense network. Since signal strength drops at a rate proportional to the transmission distance squared, reducing the transmission power by a factor of 2 only cuts the range to around 71% of its previous value. In a dense network, these transmissions will still make it to their destination, probably in less time since the amount of congestion and the number of collisions will be decreased, and consume less overall energy because of the properties of signal propagation.

In accordance with an embodiment of the invention, the above observations are used to allow the network node to self-heal. The management module 324 uses data from the datalink layer 316 which is stored in the cross layer platform 320 to modify the transmission power of the node in the physical layer 318. More particularly, the management module 324 uses the data generated at the datalink layer 316 in order to generate two metrics. The first metric is the successful transmission rate (STR) which is computed as: STR=successful transmissions/attempted transmissions. The STR provides a measure of quality of service including collisions but excluding congestion. The second metric is the clear channel rate (CCR) which is computed as: CCR=successful attempts to find a clear channel/total attempts to find a clear channel. The CCR provides a measure of congestion. Using these statistics, the management module 324 can diagnose network problems that have similar symptoms but require different corrective actions. For example, although poor link quality and collisions both result in packet loss, the appropriate response to these problems is different. Radio transmission power should be reduced if there is a high collision rate, and radio transmission power should be increased if the link quality is poor. The use of these statistics, which are generated using data from datalink layer 316, in order to adjust the radio transmission power at physical layer 318, is illustrated in conjunction with the flowchart of FIG. 4.

Figure 4:
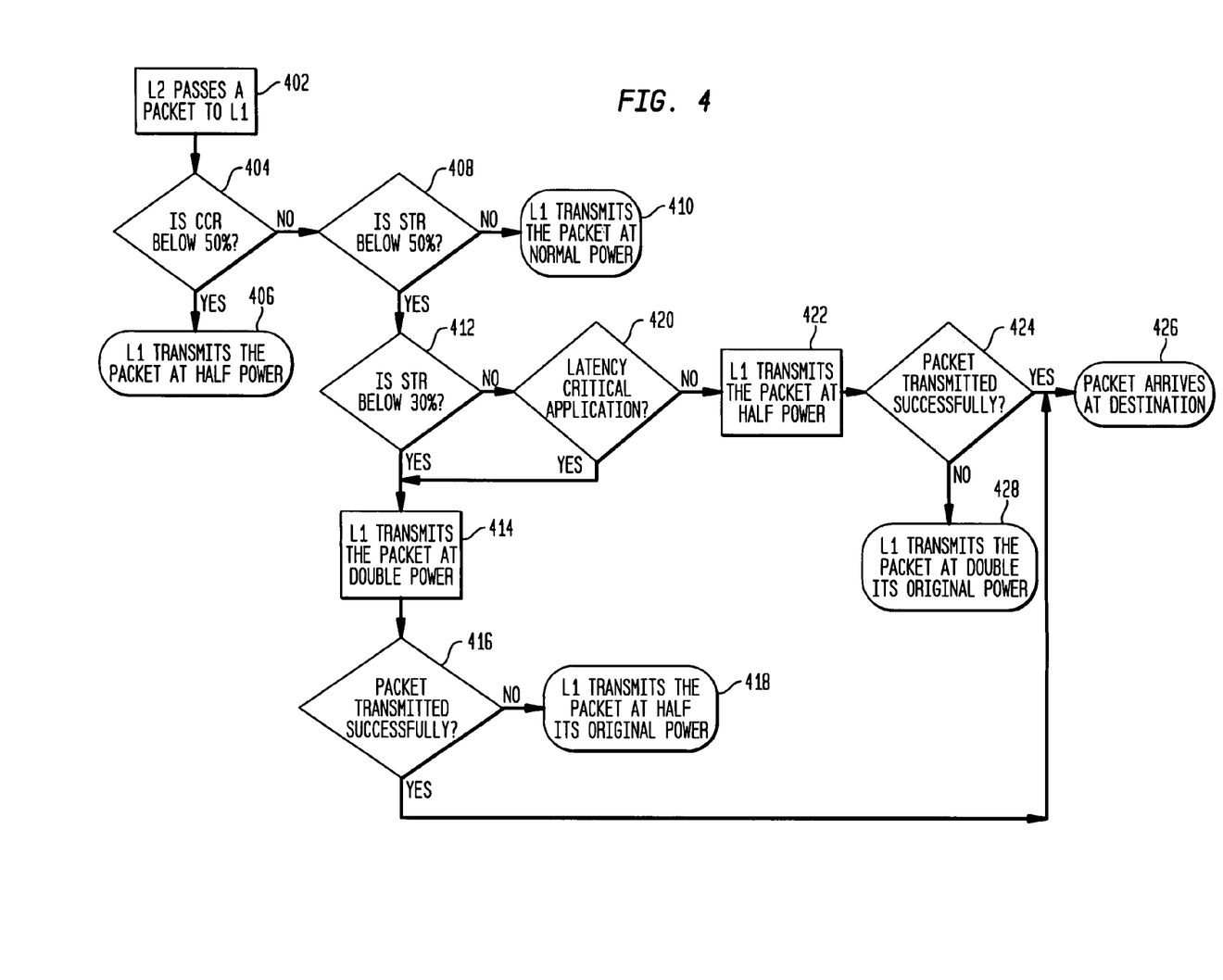
FIG. 4 is a flowchart showing the steps performed in determining modifications to transmit power based on data from the datalink layer.

FIG. 4 illustrates the management module's 324 use of the STR and CCR generated from layer 2 (L2) data to determine the appropriate modifications to layer 1 (L1). This decision is difficult to make because in wireless networks, the sender does not know whether an unacknowledged transmission failed due to a collision or due to the lack of a reliable connection. As a result, the node must estimate the appropriate response based on the available data. Referring now to FIG. 4, in step 402 a data packet is passed from the datalink layer 316, which is layer 2 (L2) to the physical layer 318, which is layer 1 (L1), for transmission across the network. In step 404 it is determined whether the CCR is below 50%. If the CCR is below 50%, then this indicates congestion in the network and the physical layer 318 (L1) is adjusted to transmit the packet at half power. If the CCR is not below 50%, then in step 408 it is determined whether the STR is below 50% (50% was chosen as the upper threshold because at that point an increase in transmission power may not increase overall energy consumption). If not, then in step 410 the physical layer 318 (L1) transmits the packet at normal power. If the STR is not below 50%, then in step 412 it is determined whether the STR is below 30%. If the test in step 412 is "NO", then it has been determined that 30<=STR<50%. At this point, the method takes different approaches to self-healing depending upon whether the current application being performed by the node is latency critical or non-latency critical (as represented by the test in step 420). In non-latency critical applications, the management module 324 transmits the packet at ½ power in step 422. In step 424 it is determined if the reduction of transmission power by a factor of 2 resulted in the successful transmission of the packet. If not, then transmission power is increased by a factor of 4 (which is double the original power) and the packet is transmitted at the new power level in step 428. By reducing the transmission power before increasing it, it is first assumed that collisions are the problem rather than poor link quality or mobility. Although this assumption may be wrong, reduced power transmissions consume one-fourth of the energy of the increased power transmissions, so it is the better method to try first. If the packet was transmitted successfully, then the packet arrives at its destination as represented by step 426.

Returning now to step 420, if the application is latency critical, then the management module 324 first increases the transmission power by a factor of 2 and thus transmits the data packet at double power in step 414. This may be able to overpower collisions or, with the routing protocol's help, may even allow the node to transmit the data packet to a node at a location which is beyond the congestion problem. Since it is a latency critical application, it is worth trading the additional energy to save time. In step 416 it is determined if the increase in power resulted in the successful transmission of the packet. If not, then transmission power is reduced by a factor of 4 (which is half the original power). If the packet was transmitted successfully in step 414, then the packet arrives at its destination as represented by step 426.

Returning now to step 412, if the STR is below 30%, then the problem is more likely to have been caused by link errors due to mobility or poor link quality rather than by collisions. As such, the management module first increases the transmission power, and if that fails, then reduces it, as described above in connection with steps 414, 416 and 418.

Figure 5A:
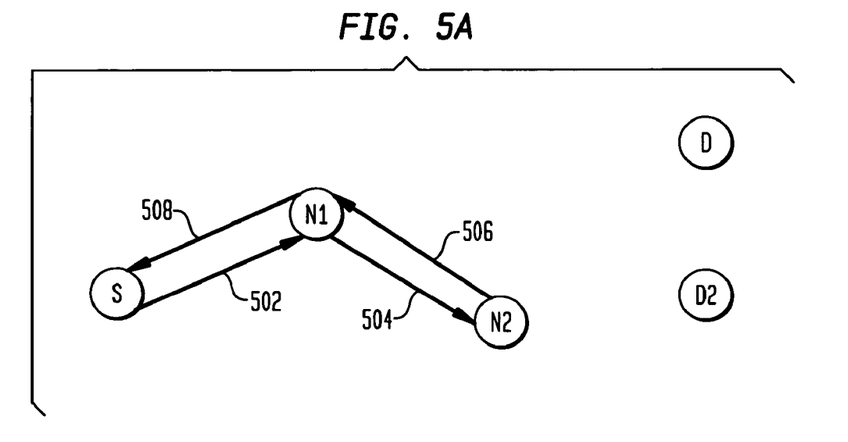
FIGS. 5A and 5B illustrate the use of cross layer information in order to redirect data packets when an original destination node becomes unavailable.
Figure 5B:
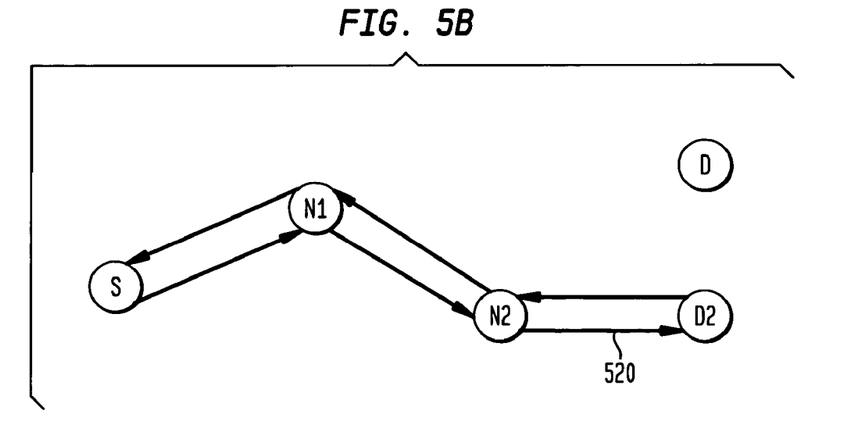

In another embodiment of the invention, the management module 324 may use cross layer information in order to redirect data packets when an original destination node becomes unavailable. FIGS. 5A and 5B illustrate this at a high level. Referring to FIG. 5A, consider source node S that has a request for destination node D. In a typical mobile ad-hoc wireless network implementation, some of the nodes may be sensor nodes which collect and generate data for other nodes which may request information from the sensor node. In the example of FIGS. 5A and 5B, node D is a sensor node from which node S is requesting some information. As illustrated in FIG. 5A, a route is established from S to N1 502 and from N1 to N2 504. However, after the transmission begins, node D becomes unavailable for some reason. S and N1 do not know this. In existing routing protocols, N2 will receive the request packet, determine that node D is unavailable, and transmit a destination unreachable error message back to S as represented by 506 and 508. Thus, the request of node S was unsatisfied, and the network wasted 4 transmissions on attempting to satisfy the request.

However, in accordance with one embodiment of the invention, and as illustrated in FIG. 5B, node N2 is able to determine that although node D is unavailable, there is another node, D2, that is interchangeable for the purpose of S's request (e.g., nodes D and D2 are in close proximity to each other and have the same sensing and processing abilities), and therefore node N2 may redirect the request from node S to node D2. Thus, instead of sending back an unreachable error message, node N2 transmits the request packet to node D2 as represented by 520. D2 may then provide the required information back to node S. This technique conserves energy and minimizes the time required to fulfill S's request by eliminating the overhead required to invalidate the current route, establish a new route, and retransmit the request. It also preserves the route if the unavailable node recovers from its failure and becomes available again.

In accordance with this embodiment of the invention, the management module 324 uses information from protocol layers 5-7 310, 308, 306 to generate a Table of Interchangeable Nodes (TIN), which is stored in the cross layer platform 320. The TIN is a list of interchangeable components for each pair of nodes. This list may, for example, only include one sensor out of many in each node. When a forwarding node determines that a packet's destination is unavailable, its management module 324 looks up the unavailable node in the TIN to determine whether there are any other nodes that can handle the request. If there is a substitute node available, the packet is redirected to the substitute node by modifying the routing protocol at the network layer 314. Thus, network information from protocol layers 5-7 is used to modify the operation of protocol layer 3 in order to improve the self-healing operation of a network node.

The TIN may also be used to make modifications at higher layers at the original source node (or other intermediate node) as well. For example, if the management module 324 of the source node determines that a packet's intended destination is on a list of unresponsive nodes (generated at layer 3 and described in further detail below), and a lookup to the TIN identifies an interchangeable node, then the source node may change the packet's destination at protocol layers 5-7 before passing the packet down to the transport layer 312. Thus, in accordance with an advantage of the invention, equivalence relationships are established among nodes in the ad hoc network by taking advantage of the fact that, unlike components in wired networks, components in wireless ad-hoc networks are redundant by nature.

Figure 6:
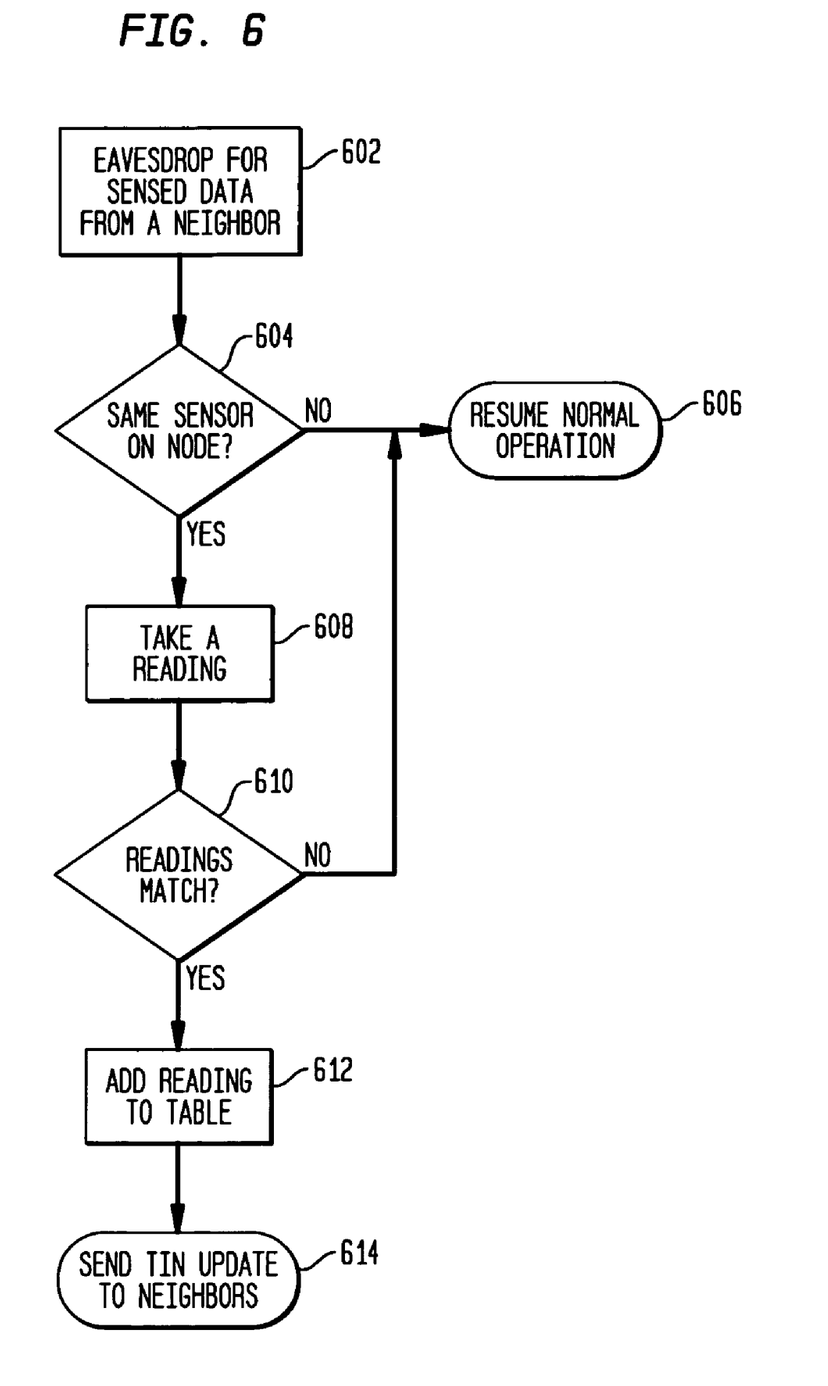
FIG. 6 is a flowchart showing the steps performed in discovering information relating to the interchangeability of network nodes.

FIG. 6 illustrates one method by which network nodes may discover information regarding interchangeability in order to maintain the TIN. This method relies on nodes eavesdropping on their neighbor node's transmissions in order to determine sensed data from a neighbor, as represented by step 602. After receiving the neighbor information, the node determines in step 604 whether it has a sensor which senses the same type of data. If not, then the nodes are not interchangeable and normal operation is resumed in step 606. If the determination in step 604 is yes, then in step 608 the eavesdropping node takes its own reading and determines in step 610 whether its own reading matches the reading of the other node. If the two readings match, then the two nodes are interchangeable with respect to the particular sensor taking the readings. The match is recorded in the eavesdropping node's TIN in step 612, and then the eavesdropping node alerts its neighbors in step 614 by transmitting a TIN update message with the sensed data. The neighbors then record the values into their own TIN tables, but they do not acknowledge or rebroadcast the message. Thus, each node's TIN is updated by either eavesdropping and performing the steps shown in FIG. 6, or by receiving the TIN update message transmitted by other nodes (step 614).

In the TIN, each sensor is listed by a unique 1 byte sensor ID (SID) number. Recording an SID for each sensor allows subsequent deployments with additional types of sensors to fit seamlessly into the system. Additionally, it allows the system designer to keep certain sensors out of the system by assigning a reserved sensor ID, such as 0. For example, system designers may not want any interchangeability in GPS readings since two nodes are unlikely to be in exactly the same location, and precision may be very important. In this case, the designer would assign the GPS sensor a SID of 0, and other nodes would not attempt to match readings or reroute requests for that sensor. This would have the effect of declaring each individual GPS sensor to be unique.

To ensure that the tables remain up to date in the face of mobility, when a node discovers that it has a new neighbor, it transmits the list of nodes interchangeable with itself along with the list of interchangeable components for each node to the new neighbor.

Figure 7:
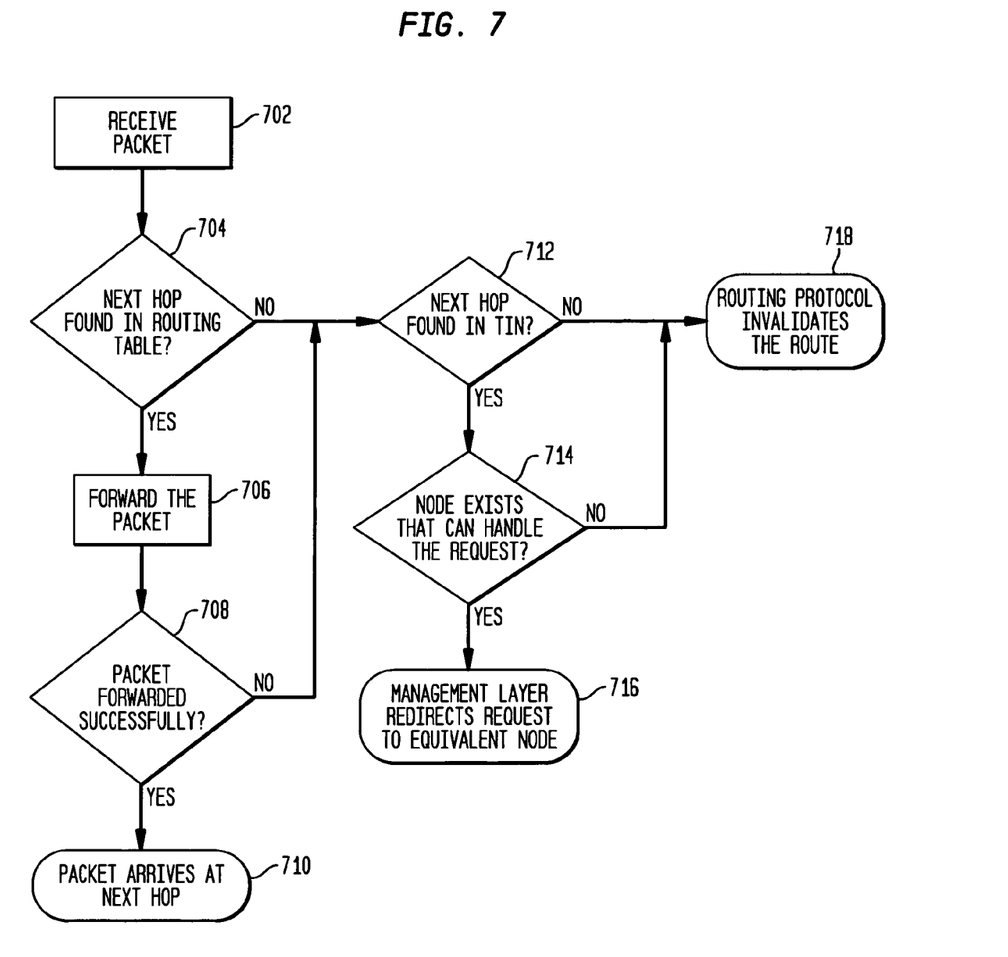
FIG. 7 is a flowchart showing the steps performed in rerouting a data packet to an alternate interchangeable node when a particular destination node is unavailable.

Having described the technique for populating and maintaining the TIN, the use of the TIN by the management module 324 will now be described in conjunction with the flowchart of FIG. 7. First, in step 702, a node receives a data packet. In step 704 the node determines whether the next hop node for the packet has been found in its routing table. If the next hop node is found, then the packet is forwarded to the next hop in step 706. In step 708 it is determined whether the packet was successfully forwarded to the next hop. If yes, then the packet arrives at the next hop as represented by step 710 and processing ends. If either the next hop is not found in the node's routing table (step 704) or the packet is not forwarded successfully (step 708), then control passes to step 712 in which the node looks up the next hop node in its TIN. If found, then in step 714 the node determines whether an alternate node exists that can handle the request. This is determined as described above. If an interchangeable node is found in the TIN, then in step 716 the management module 324 modifies the network protocol layer (L3) 314 so that the data packet is redirected to the identified interchangeable node. If an interchangeable node is not found in the TIN, then the routing protocol invalidates the route in step 718.

One skilled in the art will recognize that the there are various data structures which may be used to store the TIN in the cross layer platform 320. In determining an appropriate implementation for the TIN, it should be noted that the wireless ad hoc network may have hundreds of nodes, with very few pairs of nodes being interchangeable. Thus, the TIN will form a sparse matrix. As such, a two-dimensional matrix, the simplest implementation, is not the best implementation because it will result in an inefficient use of memory. In one advantageous embodiment, the TIN is implemented using a top-down splay tree organized by node ID. As is well known, a binary tree is a hierarchical, logical data structure used to organize related elements. Each node on the tree is linked to exactly two leaves on the next level down. A search of a binary tree is efficient, and is performed by searching down from the root, branching left or right at each step depending on whether the item to be found is less than or greater than the item in the current node, and stopping when the node containing the item is reached. A splay tree is a self-adjusting form of a binary tree, in which the restructuring technique is called splaying, which moves a specified node to the root of the tree by performing a sequence of rotations along the path from the specified node to the root. Splay trees are well known in the art, as described in D. Sleator and R. Tarjan, Self-Adjusting Binary Search Trees, Journal of the Association for Computing Machinery, Vol. 32, No. 3, July 1985, pp. 652-686, which is incorporated herein by reference.

Figure 8A:
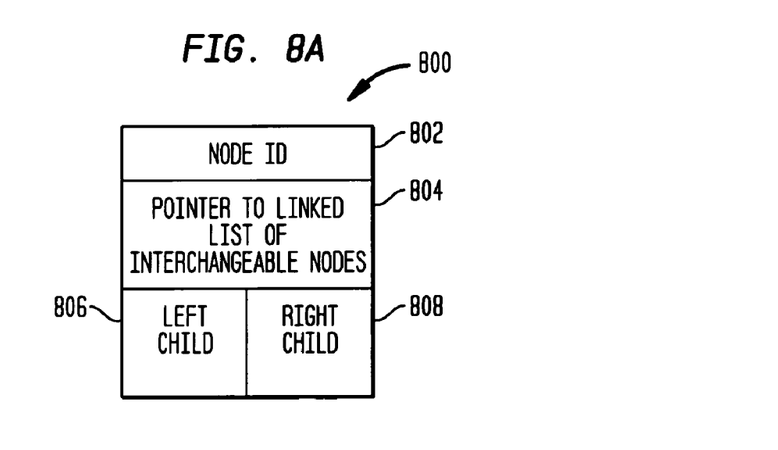
FIG. 8 illustrates a splay tree data structure for storing a table of interchangeable nodes.

One embodiment utilizing a splay tree data structure will now be described in conjunction with FIGS. 8A-8C. As shown in FIG. 8A, each element 800 of the tree contains the node ID 802, a pointer to a linked list of interchangeable nodes 804, and a pointer to the elements left child 806 and right child 808. This structure provides low search times by making an effort to reduce the depth of the tree during operations. Also, during operation the most recently accessed element is moved to the top of the tree, so that a stream of subsequent packets to a single node ID can be handled with very little overhead. Splay trees have an overhead of hundreds of computer instructions in finding and moving a node to the top of the tree, however, so in networks with primarily single-packet messages, a standard binary search tree with the same basic form may have less computational overhead and be just as efficient if it is kept balanced.

Figure 8B:
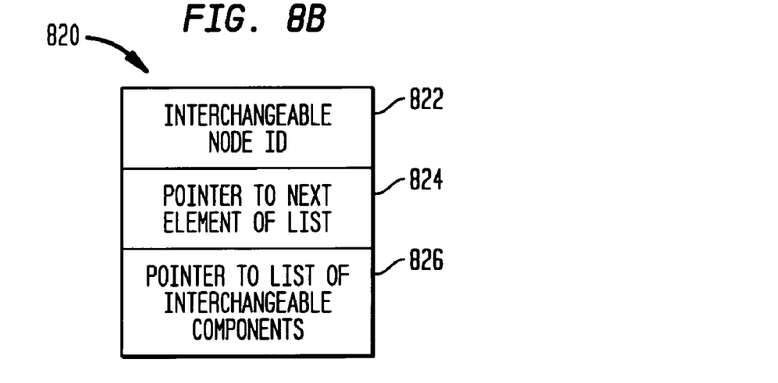

The structure of the linked list elements is shown in FIG. 8B. Each node 820 in the linked list of interchangeable nodes contains the ID of the interchangeable node 822, a pointer to the next element in the linked list 824, and a pointer to a list of interchangeable components 826. A separate list of interchangeable components is used because, in terms of sensors, two nodes will likely have a reciprocal relationship. Since each node needs to have its own entry and list of interchangeable nodes to ensure fast search times, one list of interchangeable components can be linked to both entries to reduce memory consumption.

Figure 8C:
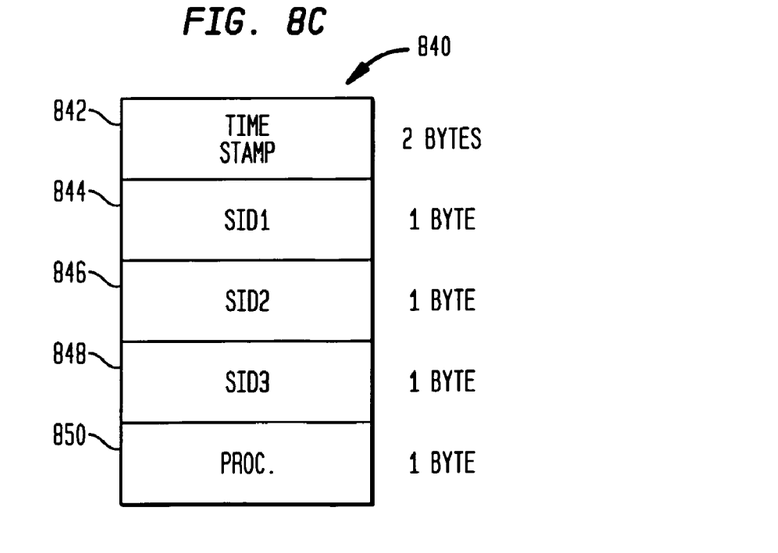

As shown in FIG. 8C, the list of interchangeable components 840 is stored in a basic structure in order to avoid the overhead of another linked list. The list 840 contains a time stamp 842, three 1 byte sensor IDs (844, 846, 848), and a 1 byte processing power variable 850. The 1 byte processing power variable 850 is used to identify interchangeability since, as described above, one list of interchangeable components may be linked to two nodes. The processing power variable 850 contains a value of 1 if the processor of the node with the lower ID number can substitute for the processor of the node with the higher ID number but not vice versa, a value of 2 if the processor of the node with the higher ID number can substitute for the processor of the node with the lower ID number but not vice versa, and a value of 3 if the processors are interchangeable.

Since there are only three slots for sensor IDs, the slots will be treated as a circular buffer. If two nodes have more than three interchangeable sensors, which we assume to be a rare case, only the three most recently accessed sensors will be stored. This method assumes a temporal locality to sensor usage that may not be true to each application, and alternative implementations utilizing a different number of sensor ID slots may improve performance in those cases.

It is noted that node mobility can affect sensor interchangeability. When an otherwise interchangeable neighbor node moves out of range of a particular node, its sensors and processor can no longer be deemed interchangeable for the particular node. To deal with the mobility issue, the timestamp 842 is used. The system keeps a one integer (e.g., 16 bits) system counter which is updated every second. Every time the list of interchangeable components 840 is updated with new information, the timestamp 842 is reset to equal the system counter. When a list of interchangeable components 840 is accessed in order to find a component on an interchangeable node, the timestamp 842 is compared to the system counter. If the system counter is more than fifteen counts greater than the timestamp, then the list of interchangeable components 840 is considered invalid. The particular lifetime (i.e., the number of counts by which the system counter must be greater than the timestamp in order to invalidate the list) of the list of interchangeable components 840 entry is highly application specific. It should be reduced in systems with high mobility so as to invalidate the list of interchangeable components 840 sooner, and increased in systems with little to no mobility so that the list of interchangeable components 840 is preserved longer.

The above described embodiment uses a timestamp because constantly updating a counter in each list of interchangeable components in the TIN would require an enormous amount of overhead. The method described herein only requires that the individual timestamps be updated when the system counter rolls over from 65,535 to 0. The update is required here because no matter how long it takes to update the counter, it will eventually roll around and pass the timestamp, thereby making a very old interchangeable node valid again. At the roll over, all outdated entries from FIG. 8B and the entry from FIG. 8C to which it links (which holds the timestamp) are deleted and current entries are remarked to 0 so that they will stay current for at least the minimum amount of time. Any entries occurring at exactly time 0 are marked 1 instead to avoid confusion. The counter is stopped while the update is occurring to ensure all stale entries are deleted. These steps combine to ensure that no entry is deleted too early, but some entries may remain valid longer than they would in the general case.

In another embodiment of the invention, the management module 324 may use cross layer information in order to redirect data packets when an intermediate forwarding node fails. In this embodiment, the management module 324 uses data obtained from the network layer 314 (L3) in order to improve node self-healing by modifying the functioning at the datalink layer 316 (L2). In accordance with this embodiment, the management module 324 generates a list of a node's recent neighbors with which it has had contact, and stores the list in the cross layer platform 320. The number of recent neighbors stored is application dependent, and an exemplary value is 5. This list may be used when an intermediate forwarding node along a packet's path fails. In many such situations, a node looking for the next intermediate forwarding node is far away from the final destination node, and therefore the TIN cannot be used to find an alternate final destination node. However, the list of recent neighbors may provide identification of alternate intermediate nodes which may be used to route around the failed intermediate node. The management module 324 would use the list of recent neighbor nodes when a failure is detected by an external failure detection scheme. As a result, it is not replacing any portion of the routing protocol. This technique advantageously preserves routes during soft failures and conserves energy in the system by making an attempt to blindly navigate the data packet around failed nodes. As noted above, in one embodiment the management module 324 stores information about the last five neighbors with which it has had contact. Since nodes in the system can be mobile, a node will typically only have time to forward a small number of packets before it sees five new neighbors. If the failed node has not resolved its problems by then, this mechanism will stop working and the routing protocol will take over. On the other hand, if, for example, a node fails due to a low resource error, it will likely recover quickly and the routes including that node will be preserved.

The number of entries in the recent neighbor list is, of course, application dependent, and will vary depending upon the application. Networks with highly mobile nodes may also want to include a timeout mechanism since routing errors will more likely be caused by nodes moving out of range than by soft failures that will be resolved quickly. In one embodiment, the recent neighbor list may be stored in the cross layer platform 320 using a circular buffer based on an array. The processing overhead in connection with the recent neighbor list would be low, and would generally entail ensuring that neighbor nodes do not appear on the list multiple times.

In another embodiment of the invention, the management module 324 uses information from layer 3 (network layer 314) stored in the cross layer platform 320 in order to improve the self-healing by modifying the functioning of layers 5, 6 and 7 (session layer 310, presentation layer 308, application layer 306). In accordance with this embodiment, the management module 324 collects information about node failures from the routing protocol at the network layer 314. This information is stored in the cross layer platform 320. Then, during processing at layers 5-7, if the management module 324 determines that an intended destination node is unavailable, this information may be passed to layers 5-7 so that a new destination may be chosen by the session layer 310, presentation layer 308, or the application layer 306. This use of cross layer information saves time and processing power by eliminating unnecessary overhead and route discovery messages that will not succeed.

In another embodiment of the invention, the management module 324 uses information from layer 4 (transport, layer 312) stored in the cross layer platform 320 in order to improve node self-healing by modifying the functioning of layer 3 (network layer 314). In accordance with this embodiment, the management module 324 collects information about duplicate packets from the transport layer 312. Using this information, the management module 324 generates a percentage of duplicate packets (PDP) and stores the percentage in the cross layer platform 320. The PDP provides a measure of latency, because both reliable high latency links and unreliable low latency links will trigger retransmissions resulting in a high PDP. For time critical applications, the management module 324 uses this information at layer 3 (network 314) to invalidate routes and force the routing protocol to reinitiate route discovery. For non-time critical applications, the management module 324 uses this information at layer 3 (network 314) to increase the timeout delay for the link.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, while the invention has been described in connection with OSI protocol model embodiments, the present invention may be implemented in any network which utilizes a layered approach to network communication and functions.

The invention claimed is:

1. A method for operation of a mobile ad-hoc network node in which network communication functions are divided into a plurality of functional layers, said method comprising the steps of:
   storing network data from at least one of said layers;
   modifying the functioning of at least one other of said layers utilizing said data from said at least one of said layers; and
   generating a table of interchangeable network nodes utilizing network data, said table comprising at least network nodes having at least one matching sensor;
   wherein said network data comprises a clear channel rate and said step of modifying comprises adjusting transmission power of said network node using said clear channel rate.

2. The method of claim 1 wherein said network data comprises a successful transmission rate and said step of modifying comprises adjusting transmission power of said network node using said successful transmission rate.

3. The method of claim 1 wherein said step of modifying comprises rerouting a data packet to a network node other than an originally specified destination node using said table of interchangeable network nodes.

4. The method of claim 1 wherein said at least one of said layers comprises a plurality of layers.

5. The method of claim 1 further comprising the step of:
   generating a list of recent neighbor nodes; and
   wherein said step of modifying comprises rerouting a data packet to an intermediate network node using said list of recent neighbor nodes.

6. A mobile ad-hoc network node for operation in a network in which network communication functions are divided into a plurality of functional layers, said node comprising:
   means for storing network data from at least one of said layers;
   means for modifying the functioning of at least one other of said layers utilizing said network data from said at least one of said layers; and
   means for generating a table of interchangeable network nodes utilizing network data, said table comprising at least network nodes having at least one matching sensor;
   wherein said network data comprises a clear channel rate and said means for modifying comprises means for adjusting transmission power of said network node using said clear channel rate.

7. The mobile ad-hoc network node of claim 6 wherein said network data comprises a successful transmission rate and said means for modifying comprises means for adjusting transmission power of said network node using said successful transmission rate.

8. The mobile ad-hoc network node of claim 6 wherein said means for modifying further comprises means for rerouting a data packet to a network node other than an originally specified destination node using said table of interchangeable network nodes.

9. The mobile ad-hoc network node of claim 6 wherein said at least one of said layers comprises a plurality of layers.

10. The mobile ad-hoc network node of claim 6 further comprising:
   means for generating a list of recent neighbor nodes; and
   wherein said means for modifying comprises means for rerouting a data packet to an intermediate network node using said list of recent neighbor nodes.

11. A mobile ad-hoc network node for operation in a network in which network communication functions are divided into a plurality of functional layers, said node comprising:
- a storage unit for storing network data from at least one of said layers; and
- a management module comprising non-transitory computer program code which, when executed on a processor, defines the steps of:
- modifying functioning of at least one other of said layers utilizing said network data from said at least one of said layers; and
- generating a table of interchangeable network nodes utilizing network data, said table comprising at least network nodes having at least one matching sensor;
- wherein said network data comprises a clear channel rate and said computer program code defining the step of modifying comprises computer program code defining the step of adjusting transmission power of said network node using said clear channel rate.

12. The mobile ad-hoc network node of claim 11 wherein said network data comprises a successful transmission rate and said computer program code defining the step of modifying comprises computer program code defining the step of adjusting transmission power of said network node using said successful transmission rate.

13. The mobile ad-hoc network node of claim 11 wherein said computer program code defining the step of modifying comprises non-transitory computer program code defining the step of rerouting a data packet to a network node other than an originally specified destination node using said table of interchangeable network nodes.

14. The mobile ad-hoc network node of claim 11 wherein said at least one of said layers comprises a plurality of layers.

15. The mobile ad-hoc network node of claim 11 wherein said computer program code further defines the step of:
- generating a list of recent neighbor nodes; and wherein said non-transitory computer program code defining the step of modifying comprises computer program code defining the step of rerouting a data packet to an intermediate network node using said list of recent neighbor nodes.

* * * * *

UNITED STATES PATENT AND TRADEMARK OFFICE
CERTIFICATE OF CORRECTION

| | | |
|---|---|---|
| PATENT NO. | : 7,764,635 B2 | Page 1 of 1 |
| APPLICATION NO. | : 11/114846 | |
| DATED | : July 27, 2010 | |
| INVENTOR(S) | : Chen et al. | |

It is certified that error appears in the above-identified patent and that said Letters Patent is hereby corrected as shown below:

In the Specification

In Column 13, Line 37, delete "(transport, layer" and insert -- (transport layer --, therefor.

Signed and Sealed this
Eighteenth Day of November, 2014

Michelle K. Lee
*Deputy Director of the United States Patent and Trademark Office*